(12) United States Patent
Cooke et al.

(10) Patent No.: US 10,298,773 B2
(45) Date of Patent: May 21, 2019

(54) SYSTEMS AND METHODS FOR CONNECTING AND DISCONNECTING TO A RING NETWORK OR LINEAR NETOWRK

(71) Applicant: Genesis Technical Systems Corp., Calgary, Alberta (CA)

(72) Inventors: Stephen Cooke, Landgon (CA); Nick Pike, West Midlands (GB); Sreejith N. Santhanu, West Midlands (GB)

(73) Assignee: Genesis Technical Systems Corp., Calgary, Alberta (CA)

( * ) Notice: Subject to any disclaimer, the term of this patent is extended or adjusted under 35 U.S.C. 154(b) by 55 days.

(21) Appl. No.: 15/246,670

(22) Filed: Aug. 25, 2016

(65) Prior Publication Data

US 2016/0366283 A1 Dec. 15, 2016

Related U.S. Application Data

(63) Continuation of application No. PCT/CA2014/050145, filed on Feb. 28, 2014.

(51) Int. Cl.
*H04M 11/06* (2006.01)
*H04L 12/24* (2006.01)
*H04L 12/437* (2006.01)

(52) U.S. Cl.
CPC ......... *H04M 11/062* (2013.01); *H04L 12/437* (2013.01); *H04L 41/0803* (2013.01)

(58) Field of Classification Search
None
See application file for complete search history.

(56) References Cited

U.S. PATENT DOCUMENTS

| | | | |
|---|---|---|---|
| 6,324,162 B1 | 11/2001 | Chaudhuri | |
| 6,359,881 B1 | 3/2002 | Gerszberg et al. | |
| 6,445,712 B1 | 9/2002 | Cooperman et al. | |
| 6,456,406 B1 | 9/2002 | Arecco et al. | |
| 7,242,861 B2 | 7/2007 | Sato et al. | |
| 8,170,004 B2 | 5/2012 | Cooke et al. | |
| 2002/0186434 A1 | 12/2002 | Roorda et al. | |
| 2003/0163831 A1* | 8/2003 | Gall | H04N 7/17309 725/127 |
| 2006/0045528 A1* | 3/2006 | Gumaste | H04J 14/0212 398/83 |
| 2007/0009262 A1* | 1/2007 | Perkins | H04J 14/0201 398/58 |
| 2009/0273842 A1* | 11/2009 | Socci | G02B 6/12007 359/577 |

FOREIGN PATENT DOCUMENTS

EP 1564933 A1 8/2005

OTHER PUBLICATIONS

Extended European Search Report from European Patent Application 14883855.0 dated Oct. 11, 2017; pp. 1-7.

* cited by examiner

*Primary Examiner* — Jason E Mattis
*Assistant Examiner* — Hong Shao
(74) *Attorney, Agent, or Firm* — McDonnell Boehnen Hulbert & Berghoff LLP (57) ABSTRACT

Systems and methods for connecting and disconnecting to a DSL ring are provided. A cross connect node is used to connect multiple endpoints into a DSL ring. When a given endpoint is powered down, a cross connect bypasses that endpoint such that the ring is maintained. POTS service is provided irrespective of whether the endpoint is bypassed for the purpose of the ring. The status of a bypassed node can be ascertained using baseband signalling.

25 Claims, 8 Drawing Sheets

SYSTEMS AND METHODS FOR CONNECTING AND DISCONNECTING TO A RING NETWORK OR LINEAR NETOWRK

REFERENCE TO RELATED APPLICATIONS

The present application is a continuation application based on and claiming priority to PCT/CA2014/050145 filed Feb. 28, 2014, the entire contents of which are incorporated by reference.

FIELD OF THE INVENTION

The invention relates generally to communications and, in particular, to systems and methods for connecting and disconnecting to a ring network or linear network.

BACKGROUND

DSL (Digital Subscriber Line) rings, such as disclosed in U.S. Pat. No. 8,170,004, and in U.S. Provisional Patent Application Ser. No. 60/706,022, filed on Aug. 8, 2005, the entire contents of both of which are incorporated herein by reference, represent a new and powerful reconfiguration of existing telecommunication network resources.

Such rings enable higher bandwidths to be achieved at greater distances from a CO (Central Office). As those skilled in the art will appreciate, the transmission bandwidth of technologies such as DSL and Ethernet decreases with distance. In a star network architecture for instance, a DSLAM (DSL Access Multiplexer) is physically located in the middle, but the distance to each subscriber is often greater than the relatively short distance required for maximum bandwidth. DSL rings greatly increase the distance and bandwidth-carrying capability of the 'local ring'. High bandwidth is made available to households by reducing the transmission distance to the distance between households instead of the distance between households and COs. Maximum bandwidth can be obtained if the distance between households that are connected together is less than the maximum bandwidth distance.

SUMMARY OF THE INVENTION

According to one broad aspect, the invention provides an apparatus for connecting a plurality of ADNs (add drop nodes) in a ring network or linear network, the apparatus comprising: a cross connect node having a plurality of ADN interfaces each for connection to a respective ADN; the cross connect node configured to form the ring network or linear network by selectively including or bypassing each ADN interface.

The apparatus may further comprise a traffic switch for adding broadband traffic to the ring or linear network and receiving broadband traffic from the ring or linear network.

The apparatus may further comprise a status detector that detects whether there is an in service ADN connected to a bypassed ADN interface. The cross connect node includes a previously bypassed ADN interface in the ring network or linear network as a function of whether the status detector detects that there is an in service ADN connected to the ADN interface.

The cross connect node may, for example, comprise:

a plurality of cross connect elements, each cross connect element for connection to a respective ADN of said plurality of ADNs, and for each cross connect element:

i) the cross connect element having a first interface and a second interface for use in connecting the cross connect elements in a ring or linear formation;

ii) the cross connect element providing one of said plurality of ADN interfaces, the ADN interface having a third interface connectable to the respective ADN and having a fourth interface connectable to the respective ADN;

iii) the cross connect element having a first state in which the ADN interface is included such that signals are passed between the first interface and the third interface, and signals are passed between the second interface and the fourth interface;

iv) the cross connect element having a second state in which the ADN interface is bypassed such that signals are passed between the first interface and the second interface without being passed to either of the third and fourth interfaces;

a cross connect controller that controls the state of each of the cross connect elements.

According to another broad aspect, the invention provides an add drop node comprising: a first broadband modem and a second broadband modem; a status indicator; a first telephone line interface; a second telephone line interface in communication with the status indicator and the second broadband modem; a POTS interface; a filter to isolate the POTS interface from the second broadband modem; a switch having a first state and a second state; the switch while in the first state connects the first telephone line interface to the POTS interface to enable a POTS signal to pass between the first telephone line interface and the POTS interface without passing through the filter; the switch while in the second state connects the first telephone interface to the POTS interface through the filter to enable a POTS signal to pass between the first telephone line interface and the POTS interface, and connects the first telephone interface to the first broadband modem to enable a broadband signal to pass between the first telephone line interface and the first broadband modem; the status indicator and the second broadband modem connected to the second telephone line interface.

According to another broad aspect, the invention provides a method comprising: providing broadband service to a plurality of endpoints with a ring network; using a cross connect node to control whether any of the endpoints are bypassed from the ring network.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Embodiments of the present invention may be applied, for example, to DSL rings as disclosed in the above-referenced patent applications. Therefore, a brief description of DSL rings is provided below.

Those familiar with DSL communications will appreciate that in one known network topology for connecting copper pairs between households and a CO, many households or customer sites are interconnected with a single CO using twisted pair cables in a star network topology. The interconnections are generally referred to as the "last mile".

The transmission bandwidth of technologies such as DSL and Ethernet decreases with distance. In a star network architecture, the DSLAM (DSL Access Multiplexer) is physically located in the middle, but the distance to each subscriber is often greater than the short distance required for maximum bandwidth. Since the telecom carriers wish to increase bandwidth to their customers, they need to keep the twisted pair distances as short as possible. DSL rings provide a mechanism for providing DSL service to subscribers located at greater distances from the DSLAM.

A problem that may occur with the rings concept is that if a user on the ring unplugs their modem, as traffic from either direction goes through a house on its way back to the core network a protection switch will occur, reducing the available bandwidth on the ring to one half its total capacity. Also, the turned off modem is removed from the ring. If multiple users turn off their modems, it is possible for "islands" to occur where there is no service (other than POTS (plain old telephone service, i.e. baseband telephony)). Once such a protection switch occurs, there is not an efficient way to repair the ring after the turned off modem has been powered one again.

There is also the problem of deploying the ring in a neighbourhood where not everyone wants to pay for the service provided by the ring.

Some embodiments of the invention provide for a direct connection that is unaffected by the presence of the ring but can be remotely configured by the service provider (i.e.: no truck roll) to add a customer into the ring. This could also provide POTS support when the power fails in the whole system.

Figure 1:
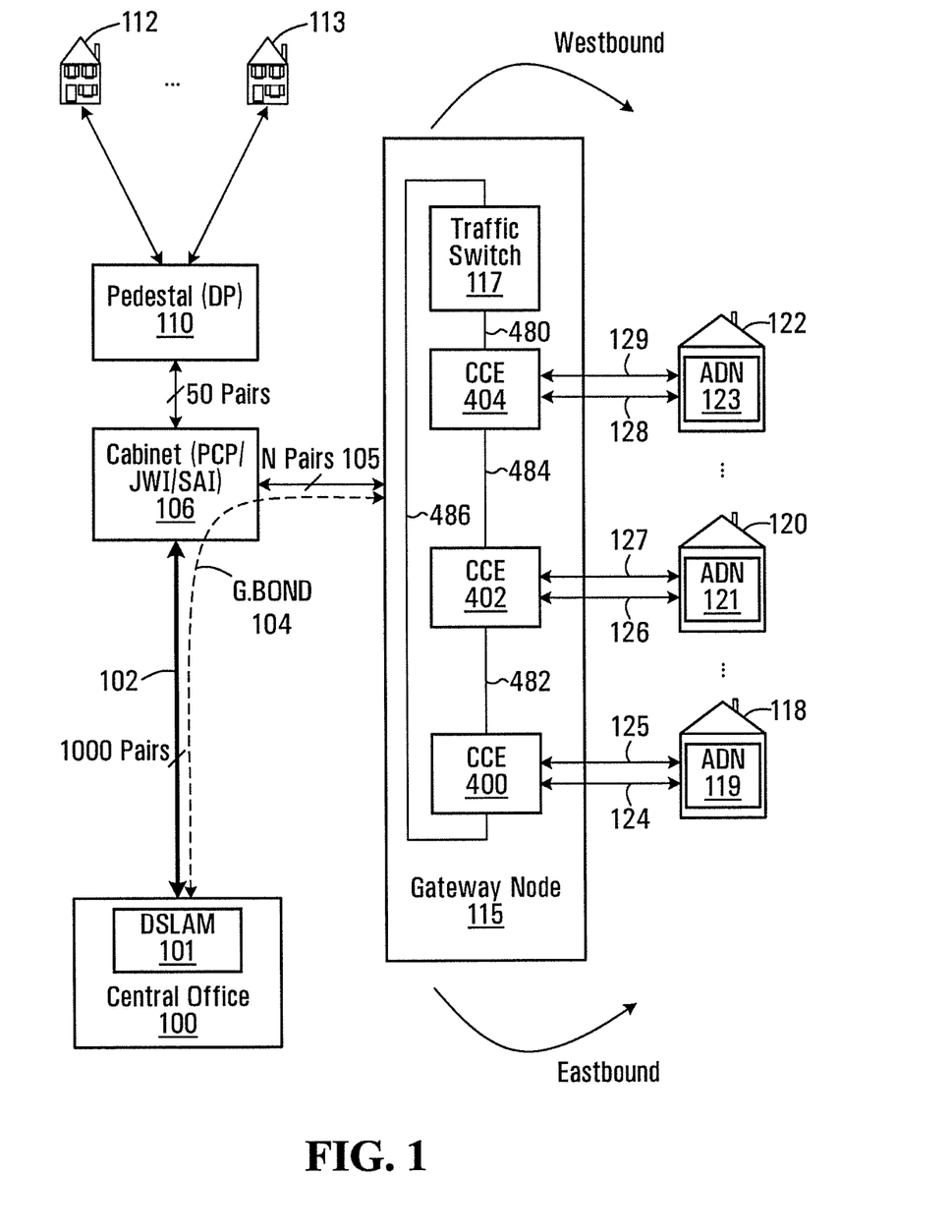
FIG. 1 is a block diagram of an example ring network topology for connecting copper pairs between households and a CO.

Referring now to FIG. 1, an example of a DSL ring network provided by an embodiment of the invention will be described. A gateway node 115 forming part of the DSL ring is depicted in FIG. 1. For the purpose of example, an example deployment of such a gateway node 115 (for example forming part of a pedestal or DP (Distribution Point)) showing connections back to a central office 100 is depicted in FIG. 1, but it should be understood that gateway node 115 is not limited to such a deployment and any suitable backhaul connection may be employed. The gateway node 115 is shown connected via N Pairs 105 to a cabinet 106 (often called a Primary Connection Point—PCP—or Jumper Wiring Interface—JWI—or Service Access Interface—SAI—depending on the terminology of the network operator) which in turn is connected to a CO 100 having a DSLAM 101 via 1000 pairs 102. The gateway node 115 is connected to the CO 100 via the N Pairs 105 and N of the 1000 pairs 102 using a bonded connection, for example in a manner similar to that described in G.Bond (ITU 998.1/2/3) 104; however, other bonding protocols may be used. The number of pairs between the CO and a cabinet is arbitrary. It may, for example but on the order of several hundreds and maybe >1000. More generally still, where in the illustrated examples it is assumed that there is a bonded connection between the gateway and the upstream network element, any suitable shared connection can be used. The connection is shared in the sense that broadband packet traffic for multiple connected ADNs can be carried on the connection. The shared connection can include one or more of bonded copper, optical or wireless to name a few examples. For the purpose of comparison, also shown is a conventional pedestal 110 connected to households 112, 113 in a star topology.

The G.Bond protocol 104 is used to obtain bandwidth from the CO 100 to the gateway node 115. The gateway node 115, which may be environmentally hardened and powered via the twisted pairs from the CO 100, terminates the G.Bond 104 traffic and acts as a gateway for the DSL ring.

Figure 4A:
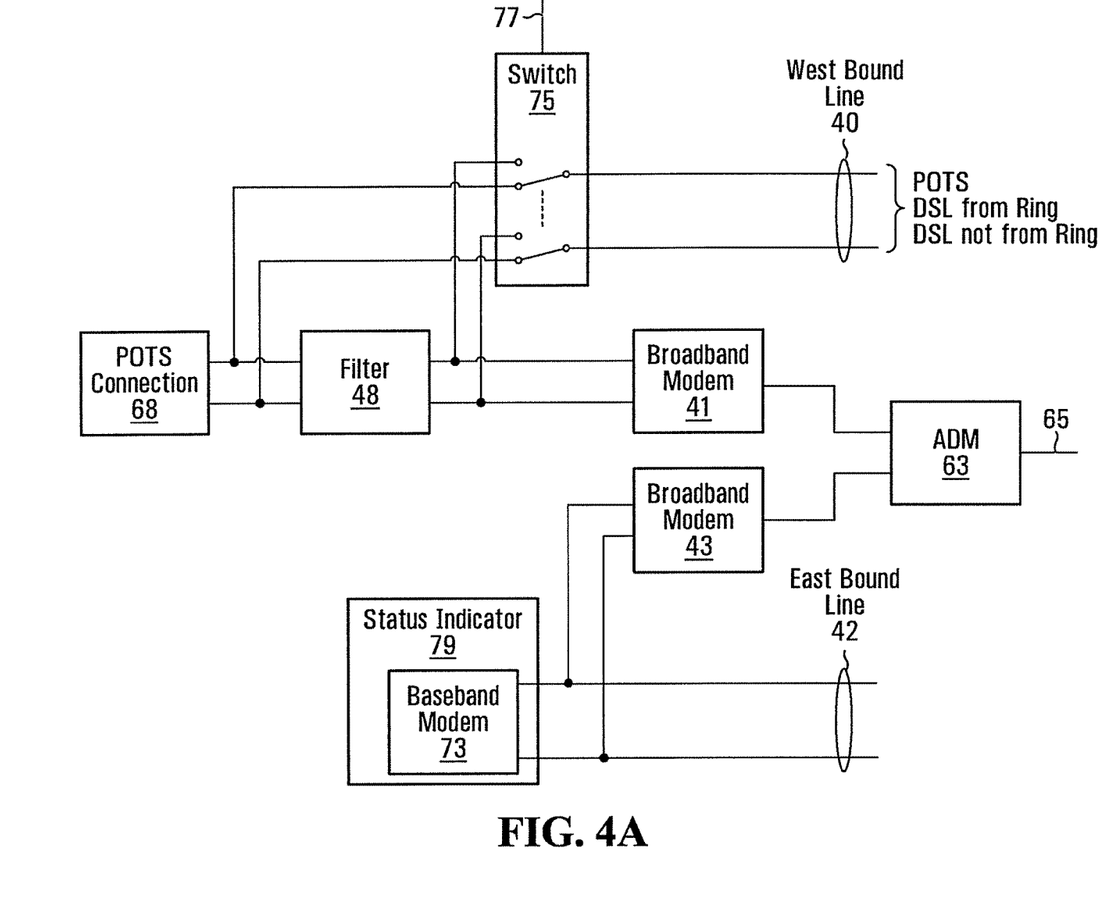
FIGS. 4A and 4B are block diagrams of an example HCC (Home Communications Centre)

The gateway node 115 has a plurality of CCEs (cross connect elements 400,402,404 and a traffic switch 117 that are connected together in a ring configuration. A set of add drop nodes 119,121,123 in households 118, 120, 122 is connected to the gateway node 115. As detailed below, traffic passing through each CCE can either be passed down to the connected ADN, or the connected ADN can be bypassed. In either case, the CCEs, connected ADNs that not bypassed, and traffic switch 117 form a ring configuration. The first ADN 119 is connected via 124,125 to CCE (cross connect element) 400 of gateway node 115 as described in further detail below with reference to FIG. 4. Similarly, ADN 121 is connected via 126,127 to CCE 402, and ADN 123 is connected at 128,129 to CCE 404. Additional households, when present are connected to respective CCEs of the gateway node 115. CCE 400 and 402 are connected together at 482, and connect connections 125,126 between households 118 and 120; and CCE 402,404 are connected together at 484, and connect connections 127,128 between households 120 and 122. CCE 404 is connected to a traffic switch 117 at 480 which is also connected to CCE 400 at 486 to close the ring. More generally, an arbitrary number of households can be included on the ring.

Connections from the households to the CCEs may be achieved by making connections on a patch panel that forms part of a pedestal containing the gateway node 115. The connections to and from the CCEs, and the connections between the CCEs form part of a DSL ring. In this manner the configuration of the DSL ring is very flexible and can easily be changed by simply modifying the set of patches.

In the illustrated example, the bandwidth from the CO 100 to the gateway node 115 is provided through a bonding approach. In particular, a set of pairs from the DSLAM 101 can be grouped as a logical pipe that provides higher bandwidth than individual pairs. This logical pipe is then used to transmit packets to and from the gateway node 115 and any of the households on the DSL ring. For example, assuming individual pairs between the DSLAM 101 and the gateway node 115 support 4 Mb/s each, this being a function of the distance between the DSLAM 101 and the gateway node 115, and 32 such pairs can be combined to produce 128 Mb/s bandwidth, this bandwidth may be passed around the ring with 64 Mb/s, or in any other proportion desired, being transmitted in each direction by the gateway node 115. Regarding the availability of double the maximum VDSL2 bandwidth, home routers may be able to handle less than this amount, for example 100 Mb/s. This would not pose a problem so long as there is not more than that amount of traffic to drop at a given household or the household had high capacity equipment such as a GigE router. The maximum current VDSL2 ring bandwidth in a symmetrical implementation is just over 200 Mb/s.

While throughout this description copper pairs are referred to, more generally any electrically conducting twisted wire pairs and possibly other types of connections can be employed. As detailed above, each household 118, 120,122 has an add drop node 119,121,123 that provides packet add/drop functionality. The location of such ADNs is not limited to being in households. In a particular example, the add drop node is an HCC (Home Communications Centre), which enables DSL ring topologies in telecom service provider networks. An example HCC is described in detail below with reference to FIG. 4. A 'Ring' is a special case of the more general 'Daisy Chain of Add/Drop Multiplexers (ADMs)' where the 'Ring' goes out from, and returns to, the same gateway node, which may, but need not necessarily be, a CO. Another example would be a set of ADMs between two different COs or even a serially-connected network 'stub' sometimes referred to as a linear ADM (i.e., a set of ADMs that initiates from a particular gateway node, but terminates at another gateway node).

By physically, electrically, and/or logically connecting the twisted pair cables of customers so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local ring'. High bandwidth is made available to the households by reducing the transmission distance to that between households instead of between households and gateway nodes or Central Offices. Maximum bandwidth is obtained if the distance between houses connected together is less than the maximum bandwidth distance.

In some embodiments, existing "last mile" cables are utilised by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables.

In some implementations, once the new topology is available, a complete package of services with a documented feature evolution is implemented. The complete package may for example include combinations of features such as Internet Home Theatre or Internet Protocol TeleVision (IPTV), Automatic Meter Reading (AMR), Home Security Monitoring, Virtual Private Networking, Internet Security and Connection Maintenance (i.e., platform updates performed without customer intervention), and Medical Aid Monitoring.

The above description has focused on a ring topology. However, it is to be understood that a ring topology is not required. More generally, any appropriate topology interconnecting communication nodes may be implemented. An example of another topology that could be employed is a linear ADM or "Daisy Chain" topology. A linear ADM topology may be implemented whereby a set of communication nodes are connected together in series. A ring topology is a topology in which two end communication nodes are interconnected.

Figure 2:
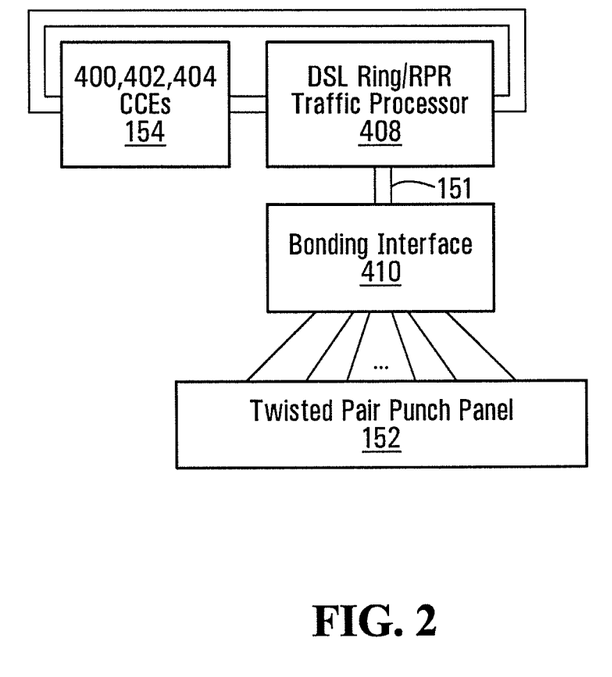
FIG. 2 is a block diagram of an example gateway node.

FIG. 2 shows additional functionality that might be included in some gateway node implementations. This includes a bonding interface 410 (for example a G.Bond-capable xDSL interface) and a twisted pair punch panel 152. More generally, any set of components capable of exchanging traffic between the main network and the DSL ring can be used. This can be included in a gateway node that also includes a DSL Ring/RPR traffic processor 408 that may be basically the same as in the HCC described below. Traffic processor 408 is a specific example of the traffic switch 117 of FIG. 1. In this case, the DSL Ring/RPR traffic processor 408 behaves in the same way as a communications device on the below described HCC, and is with an add/drop port 151 to the bonding interface 410; the only difference here is that substantially all of the traffic will be going to/from that device, with the possible exception of any traffic that might be terminated at the gateway node per se. Traffic processor 408 is connected to a serially connected set of CCEs 400,402,404 which in turn are connected back to traffic processor 408 to form a ring. A gateway node may include additional communications interfaces such as USB port(s), WiFi ports, a femtocell interface, etc., as described for the HCC 76 (FIG. 4).

In some embodiments, at each node in the ring is a full ADM, based for example on VDSL2. The DSL transmission distance starts at zero again on each individual hop. In most cases these hops back to the gateway node and then to the neighbour's house are less than 300 meters (<1000 ft). VDSL2 bandwidth at this distance is in the >100 Mb/s range (depending on the VDSL2 chipset manufacturer's specifications and the cable quality).

With rings there are two paths into and out of each house, each with the potential capability of carrying >100 Mb/s. Therefore the bandwidth potential for this scenario is potentially greater than 200 Mb/s (100 Mb/s eastbound and 100 Mb/s westbound) depending on the number of bonded pairs and the actual distance from the DSLAM to the pedestal. Basically the greater the number of subscribers on the ring, the greater the bandwidth pool available due to the greater number N of pairs available for bonding in the G.Bond 104 stream.

Rings also have the advantage of protecting themselves such that, if a single pair on the ring is cut, the traffic can be sent in the opposite direction to get to the gateway node. This is useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service. In addition, the CCEs can connect and disconnect individual households from the ring as detailed below.

In some embodiments, Local Ring Unbundling (LLU) is accomplished. In some embodiments this is achieved using the logical separation that is currently done via co-location in the CO (i.e., the traffic is carried by the incumbent from the customer to the CO and then handed off). In other embodiments, another gateway node is installed in a pedestal or distribution point along with co-location in the CO. The pedestal could be a PCP/JWI (Primary Connection Point/Jumper Wiring Interface/Service Access Interface). This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

In another embodiment, a wireless interface can be used through which the reach of the wireline network can be extended to reach other devices not connected directly by wireline connections. A second set of households can be connected in a similar manner as described for the main network (the network described in previous embodiments), with wireline connections between pairs of households in a linear manner that might form a ring or linear ADM for example. At least one of the households of the second set has a wireless connection to one of the households of the first set on the ring, to thereby connect the second set of households into the ring.

In some embodiments, a wireless interface is available for performing protection switching in the event of failure of one or more wireline connections.

In some embodiments, a wireless connection can be used between the endpoints of two linear ADM topologies to complete a ring topology.

In some embodiments, the ring transmission protocol is based on the IEEE 802.17 RPR standard with some modifications to allow for different possible bandwidths between nodes and overall lower peak bandwidths. RPR was designed for metro optical networks. Ethernet-based rings, implementing Ethernet Automatic Protection Switching (EAPS) according to ITU-T Recommendation G.8031/Y.1342, for instance, are also contemplated.

In some embodiments, packet add/drop functionality is included in each node to add/drop packets. More generally, traffic add/drop functionality is included. This might include packet add/drop functionality, or traffic implemented using timeslots or wavelengths/frequencies to name a few specific examples.

This description contains many references to DSL communication. This may for example be ADSL (Asynchronous DSL), ADSL2+(Asynchronous DSL Version 2+), SDSL (Symmetric DSL), Uni-DSL (Universal DSL), VDSL (Very high bit rate DSL), and VDSL2 (Very high bit rate DSL version 2) or a future iteration of DSL that may or may not include Dynamic Spectrum Management (DSM) functionality. However, other broadband communications protocols may alternatively be employed. For example, G.SHDSL and Vectoring are other possible technologies.

As noted above, embodiments of the present invention may be applied to DSL rings. It should be appreciated, however, that FIGS. 1 and 2 and the foregoing description are intended solely as illustrative examples of the types of networks or topologies in conjunction with which embodiments of the invention may be implemented. Thus, the present invention is not necessarily limited to any particular types of network, topology, equipment, or protocols, for instance.

Figure 3:
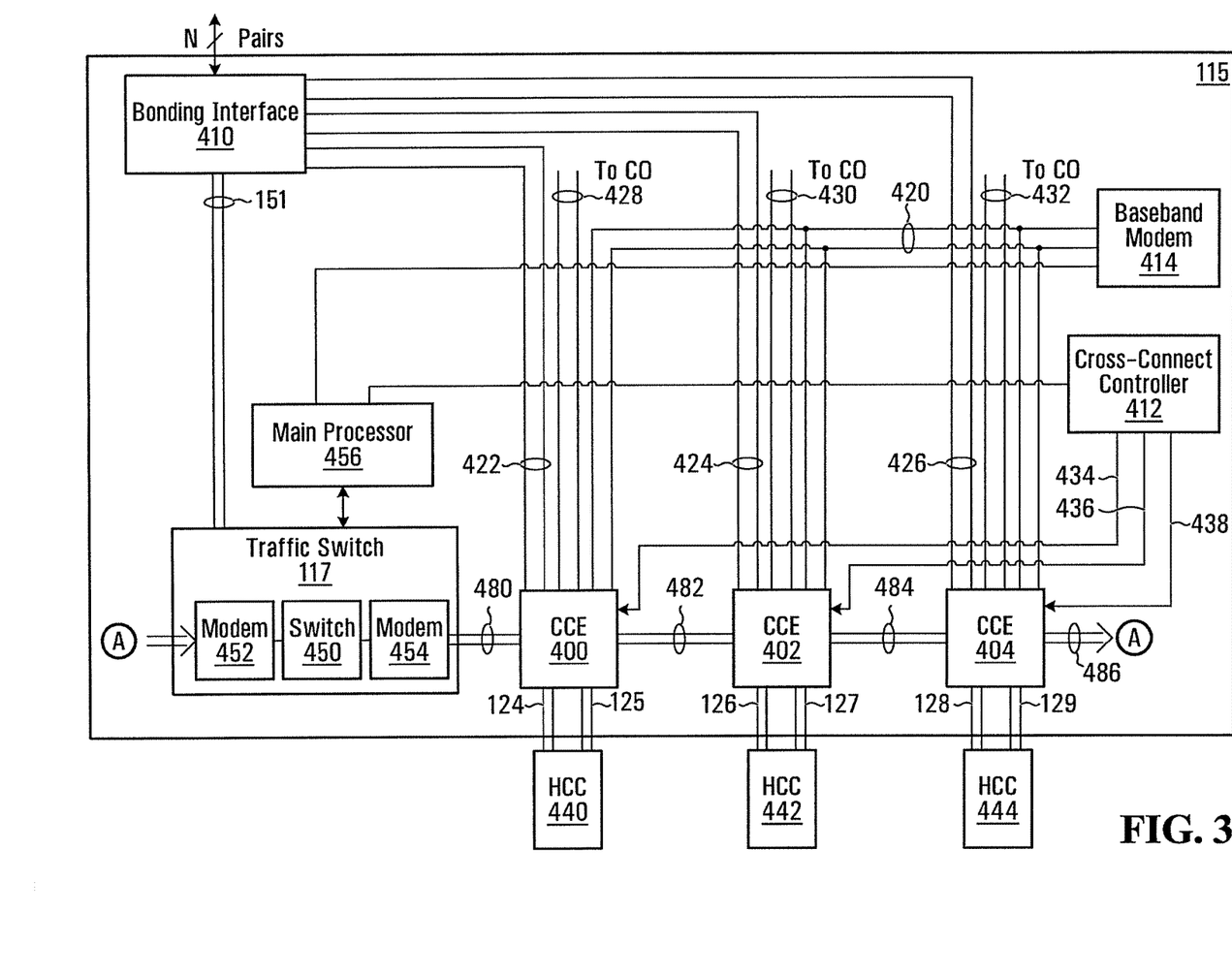
FIG. 3 is a more detailed block diagram of a gateway node.

FIG. 3 is a detailed block diagram of an example implementation of the gateway 115 of FIG. 1. Common reference numbers are used where appropriate. The gateway has a plurality of cross connect elements (CCE) 400,402,404. Each CCE is shown connected to a respective HCC 440,442,444 (more generally ADNs) via previously described connections 124,125,126,127,128,129. HCCs 440,442,444 are specific examples of add drop nodes, and are not part of the gateway 115. The number of CCEs may establish the number of HCCs that can be directly connected to the ring. In some embodiments multiple HCCs can be connected to a single CCE, for example through a party line. While the example shows three CCEs, more generally, the number is implementation specific. Adjacent CCEs are connected together. CCE 400 and CCE 404 are each connected to traffic switch 117 to create a ring structure. Specifically, connections 480,482,484,486 connect each CCE to adjacent CCEs and/or the traffic switch 117. The traffic switch 117 is connected at 151 to a bonding interface 410. The bonding interface 410 uses N twisted pairs to implement a bonded connection back to a central office. Also shown is a cross-connect controller 412, a modem 414, which may be a baseband modem, and a main processor 456 that controls overall operation of the gateway node. The main processor 456 is connected to the traffic switch 117, the modem 414, and the cross-connect controller 412. The cross-connect controller 412 is also connected to each of the CCE's as detailed below. The modem 414 is connected to the main processor 456 and to each of the CCE's as detailed below. In a specific example, the modem 414, main processor 456 and the traffic switch 117 are part of a common circuit board. In some embodiments, the main processor 456 and the traffic switch 117 in combination deliver functionality similar to that of the DSL ring/RPR traffic processor 408 of FIG. 2.

In a particular example implementation, the traffic switch 117 contains a switch 450 (for example an Ethernet switch) connected at 151 to the bonding interface 410. The switch is also connected to two modems 452,454 and can route traffic received from the bonding interface 151 towards either of the two modems. Traffic sent by the switch 450 to modem 454 is sent on to CCE 400, while traffic sent by the switch 450 to modem 452 is sent on to CCE 404. Traffic received by the switch 450 from either modem 452 or modem 454 is sent towards the bonding interface. In some embodiments, some traffic could pass across the switch between the modems for CCE-to-CCE communications.

In addition to the above described connections to adjacent CCEs and/or connections to traffic switch 117, and the connections to the HCCs, each CCE 400,402,404 has:

respective twisted pair connections 422,424,426 to the bonding interface 410;
respective twisted pair connections 428,430,432 to the central office;
respective control connections 434,436,438 to the cross-connect controller 412;
a twisted pair connection 420 to the modem 414.

The cross-connect controller controls the CCEs 400,402,404 through the respective control connections 434,436,438, making use of information received via the modem 414 as detailed below.

FIG. 4A is an example of an HCC provided by an embodiment of the invention. Where the term HCC is used herein, more generally, any ADN (add drop node) may be employed, such a node being capable of participating in a linear or ring network, so as to add traffic to the ring or drop traffic from the ring. Such a node may be in a home or otherwise located. The HCC is connected to the westbound phone line at 40, and to the eastbound phone line at 42. The two phone lines 40,42 are for connection to one of the CCEs in the gateway node. The westbound phone line 40 is connected to a POTS connection 68 and a first broadband modem 41 through a switch 75 that has a control input 77.

Switch 75 serves to isolate the ring broadband service from any other broadband service provider. When the switch is in the first state as depicted in FIG. 4A, the westbound phone line 40 is connected directly to the POTS connection 68.

When the switch 75 is in the second state (not shown), the westbound phone line 40 is connected to the POTS connection 68 via the filter 48 which passes the POTS signal, but not a DSL signal, and is connected to the broadband modem 41. Eastbound connection 42 is connected to a second broadband modem 43, and to a status generator 79, which in the illustrated example includes a baseband modem 73. The first broadband modem 41 is connected to an ADM (add drop multiplexer) 63 which is connected at 65 to other functionality of the HCC (not shown), and is connected to the second broadband modem 43.

Behaviour of the HCC is a function of whether the HCC is powered on or not, and is also a function of the position of switch 75. The position of switch 75 is indicative of whether DSL service is to be provided to the particular HCC via the ring, for example, if subscription to DSL service has been purchased. When the switch is in the position depicted, referred to hereinafter as the "disconnected" position, the HCC is not connected to the DSL ring, and the signal delivered to POTS connection 68 may be POTS only, or POTS plus DSL content from another DSL service provider that does not arrive via the ring. If an external DSL modem (not shown) is connected to POTS connection 68, typically through an external filter, DSL service could be delivered in that manner. Filter 48 blocks any DSL content from going to broadband modem 41.

The default position of switch 75 may be the position depicted, namely the disconnected position. The CCE to which the particular HCC is connected will also be switched such that the particular HCC is bypassed, irrespective of the power on/off state of the HCC. The gateway node does not need to attempt to ascertain the status of such a device. The gateway can instruct the HCC to change the position of switch 75 to the other position, for example by sending an instruction via the baseband modem.

When the switch 75 is in the other position, referred to hereinafter as the "connected position", the power on/off state of the HCC dictates whether the HCC can be part of the ring or not. When the HCC is powered on, and switch 75 is in the connected position, and the associated CCE is directing traffic to and from the HCC, DSL traffic arrives at westbound phone line 40 from the ring, is passed to broadband modem 41, and then on to ADM 63. ADM 63 determines whether a given packet is addressed to the particular device in which case the given packet is dropped for processing/handling elsewhere in the device. Otherwise, the given packet is passed on to broadband modem 43, and then output on eastbound phone line 42. The same processing takes place for traffic that arrives on eastbound phone line 42.

When an HCC with switch 75 in the connected position is powered down, POTS service is still available through POTS connection 68, but DSL packets received from the CCE are not processed or forwarded since the broadband modems are not on. The break in the ring will be detected as described previously, and the particular HCC will be removed from the ring by appropriate control of the CCE to which the HCC is connected. While the HCC is powered off, the status indicator 79 is also off. The absence of any signal from the status indicator indicates that the particular HCC is powered off.

When an HCC with switch 75 in the connected position is powered on again, the status indicator will be powered on. It will be possible for the gateway node to ascertain the status of the device (i.e. whether the device is powered on or off), for example by communicating with the device via the baseband modem 73 from the modem in the gateway node as described elsewhere herein. When it is verified that the particular HCC is powered on again, the CCE can be controlled to switch the HCC back into the ring.

Figure 4B:
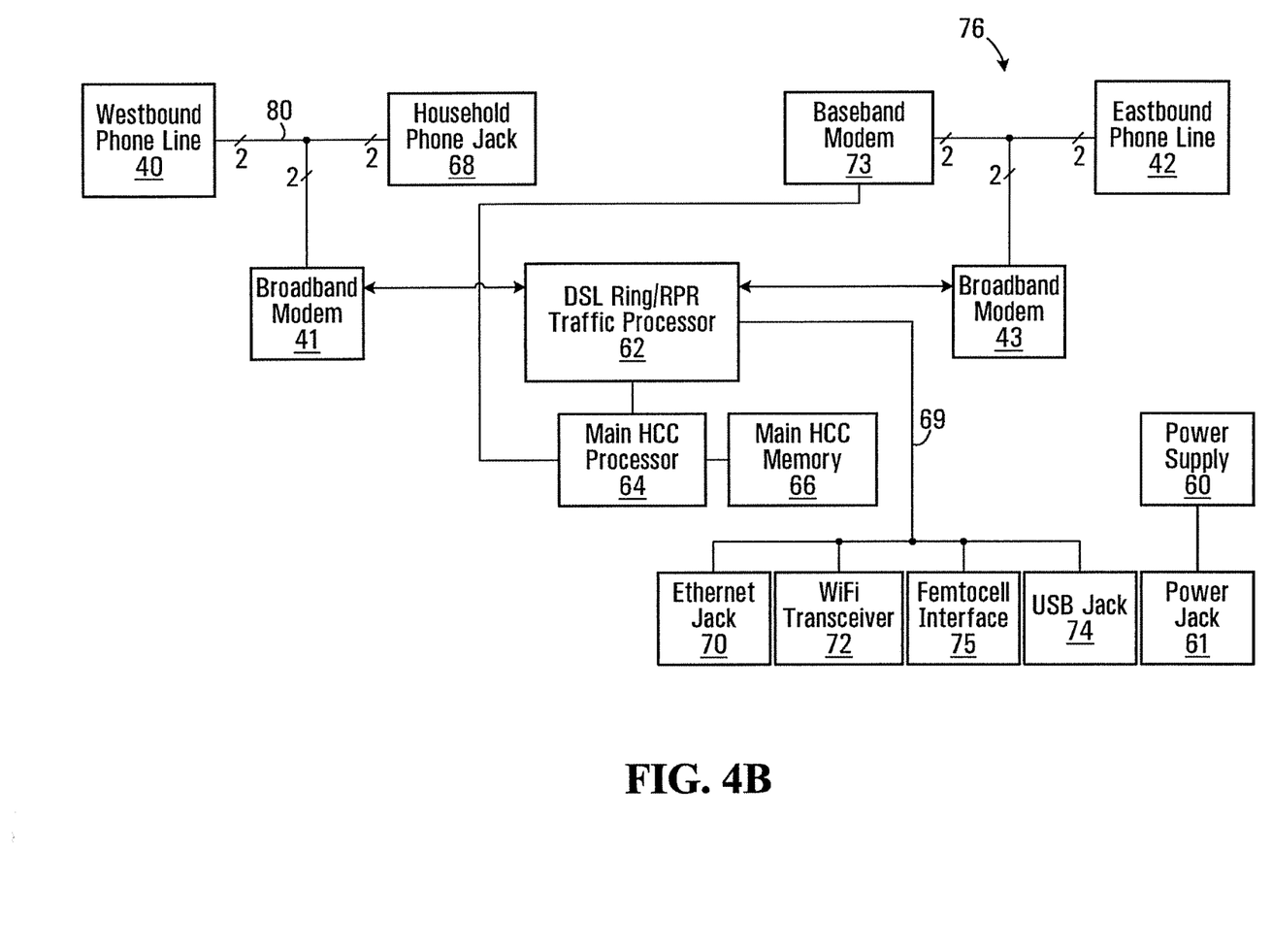

Referring now to FIG. 4B, shown is a block diagram of another example HCC (Home Communications Centre) generally indicated at 76. Elements that are in common with the example of FIG. 4A are similarly numbered. It is to be understood that the HCC 76 shown in FIG. 4B is very specific for example purposes only. In general, equipment in conjunction with which an HCC may be implemented may include fewer, further, or different components, interconnected in a similar or different manner than shown.

The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a pair of wires, typically but not necessarily copper. The HCC has a DSL Ring/RPR (Resilient Packet Ring) traffic processor 62 (a specific example of an ADM) coupled to the westbound phone line 40, for example through VDSL2 modem 41 (more generally a broadband modem), and coupled to the eastbound phone line 42, for example through VDSL2 modem 43 (more generally a broadband modem). The HCC also has a main HCC processor 64 and a main HCC memory 66 accessible by the main HCC processor 64. The main HCC processor is also connected to the DSL Ring/RPR traffic processor 62. A power supply 60 is coupled to a power jack 61. A household phone jack 68 is connected to the westbound phone line 40. In some embodiments, there is a relay/switch that connects to a VoIP capability that is disabled when the power fails. A baseband modem 73 is connected to the eastbound phone is also connected to the main HCC processor 64. Other possible interfaces include an Ethernet jack 70 a WIFI transceiver 72, a femtocell interface 75, and a USB jack 74. There may be other components, but they are not shown for sake of simplicity. The traffic processor 62 has add/drop ports 69 that connect the various interfaces to the traffic processor. The HCC of FIG. 4B may further include switch circuitry and filters (not shown) similar to the embodiment of FIG. 4A.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 76, or forward the packet to its destination via the eastbound phone line 42 if it is addressed to another HCC. In some implementations, packets are routed on a per packet basis. The HCC 76 may also generate packets associated with a local communication device and forward the packets to their destination. In some embodiments, protection switching of traffic is handled by an industry-standard protocol designed specifically for this task. An example of this would be RPR (IEEE 802.17) technology. RPR was developed for the optical transport infrastructure, but might also be adapted to fit well into this application.

There are two twisted copper pairs: the westbound phone line 40, and the eastbound phone line 42 (i.e., in opposite directions). In some implementations, communication over a phone line is bi-directional. In some embodiments, the data rate is symmetrical (i.e., transmit bit rate=receive bit rate) for both eastbound and westbound directions. In some embodiments, flow control mechanisms are used so that the data rate is the same around the ring and so that there are no links that are faster than others. A given household may communicate with the CO by an eastbound path and/or a westbound path. Communications with households may also be through a wireless mesh overlay via the WiFi and/or femtocell interfaces 72, 75, to provide for wireless backhaul for instance. In some implementations, if communication on a ring via one direction is not possible, then communication via the other direction is attempted.

The household phone jack 68, the Ethernet jack 70, the WiFi transceiver 72, and the femtocell interface 75 provide communication interfaces for the household. The USB jack 74 may, in addition to providing a further communication interface, enable memory expansion and maintenance access for the HCC 76 when it is installed. The HCC 76 may be installed in a residence or business premises and remains with the residence/business premises permanently. This can be used to enable AMR (automatic meter reading) functionality, for instance. In some implementations, the architecture combines existing home phones with mobile phones. This may for example include most recent and/or backward compatible wireless interfaces. In some embodiments, the HCC 76 has one or more wireless interface(s), for example the WiFi (IEEE 802.11 a/b/g/n) interface 72 and femtocell interface 75 to enable communication with wireless devices, such as wireless appliances, stereos, PCs, TVs, meters, mobile phones, Set Top Boxes (STBs), etc.

In some implementations, QoS (Quality of Service) is provided so as to provide certain communications with greater priority than other communications. A list of example communications with decreasing priorities may be VoIP (Voice over Internet Protocol) communication, streaming video communication, Internet Gaming, Business Services and non-streaming data communication. Having a greater priority provides streaming communication with a greater likelihood of being uninterrupted and having less latency and/or jitter. In some implementations, a COS (class of service) is used as detailed in the RPR specification so as to prioritize traffic on the ring. This enables carriers to sell what are referred to as SLAB (service level agreements) to their customers based on traffic volume at each priority level. For example, customer A might get X GB/month of Priority 1 traffic and Y GB/month of Priority 2 traffic, etc. while customer B may get totally different traffic profiles.

In some embodiments, the HCC 76 is partially powered from the phone lines so there is no dependency on household current supply for landline-based phone service. In some implementations, the household phone jack 68 and the traffic processor 62 are powered by phone line 42 while the remaining components may be powered by household current (i.e., would have to be 'plugged in'). For example, phone line 42 could supply power via the potential difference between the first copper wire 78 at −48V and the second copper wire 80 at 0V in a DC-based architecture.

In some embodiments, the traffic processor 62 controls the traffic that is on the ring via the RPR protocol and VDSL2 standards. For such implementations, it also controls the VDSL2 interface chips. It will also control bandwidth asymmetry and any protection switching activity, for instance. The main processor 64 might for example implement functions such as the firewall/VPN, control of the WiFi interface, control communications with the network, access rule implementations (e.g. user authentication, WiFi interface logical segmentation between users, SLA policing, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some embodiments, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC may involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older 'black' telephones (e.g.: those that do not have power cords) so that phone calls can still be made during a power failure. In some implementations, the HCC takes this into account and offers the capability to be powered from the telecom carrier Central Office (CO).

Having a star topology means that no one else can 'listen' to another's phone calls, as there is no one else in the transmission path. In some implementations, the HCC provides similar capability via encryption. Regarding the encryption of traffic, in some embodiments all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the HCC 76, specific example interfaces are shown. In one particular example, an HCC has an Internet firewall/VPN (Virtual Private Network), 2 or 3 phone jacks (RJ11), a USB port for memory expansion and maintenance access, a WiFi interface, a femtocell interface and one or more Ethernet cable jacks (RJ45). However, more generally, any suitable interface or combination of suitable interfaces may be implemented. Also in the illustrated example, processing is accomplished using a specific implementation of processors and memory. More generally, processing may be accomplished using any appropriate implementation of software, hardware, firmware, or any appropriate combination of software, hardware and firmware. The minimum functionality that needs to be included in each communications node is a traffic add/drop function. In the above example this is implemented in the traffic processor 62 but other implementations are possible.

Figure 5:
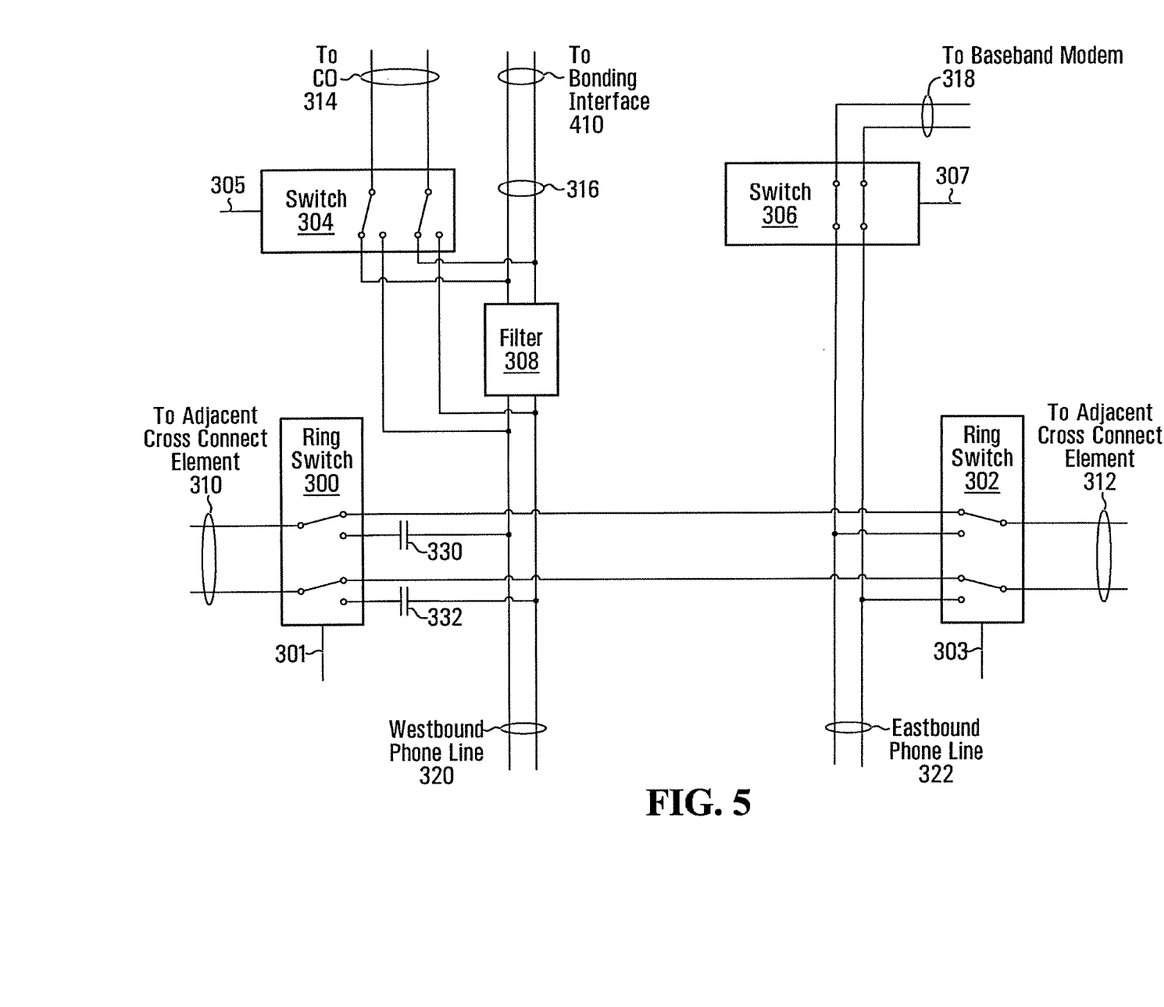
FIGS. 5 to 7 are block diagrams of an example gateway node in various states.

FIG. 5 depicts a single cross connect element. As described with reference to FIG. 3, the cross connect element is part of a gateway node, and there are a plurality of interconnected cross connect elements connected to form a ring.

Inputs to the cross connect element include:

a twisted pair 314 connected back to a central office or other upstream network element (not shown);

a connection (typically a track on a board) 316 connected to a bonding interface forming part of the gateway node;

a connection (typically a track on a board) 318 to the baseband modem (not shown);

a connection (typically a track on a board) 310 to a first adjacent cross connect element (or traffic switch);

a second connection (typically a track on a board) 312 to a second adjacent cross connect element (or traffic switch);

a first twisted pair for connection to an HCC (home communications centre) referred to as a westbound phone line 320;

a second twisted pair for connection to the HCC referred to as an eastbound phone line 322.

Figure 6:
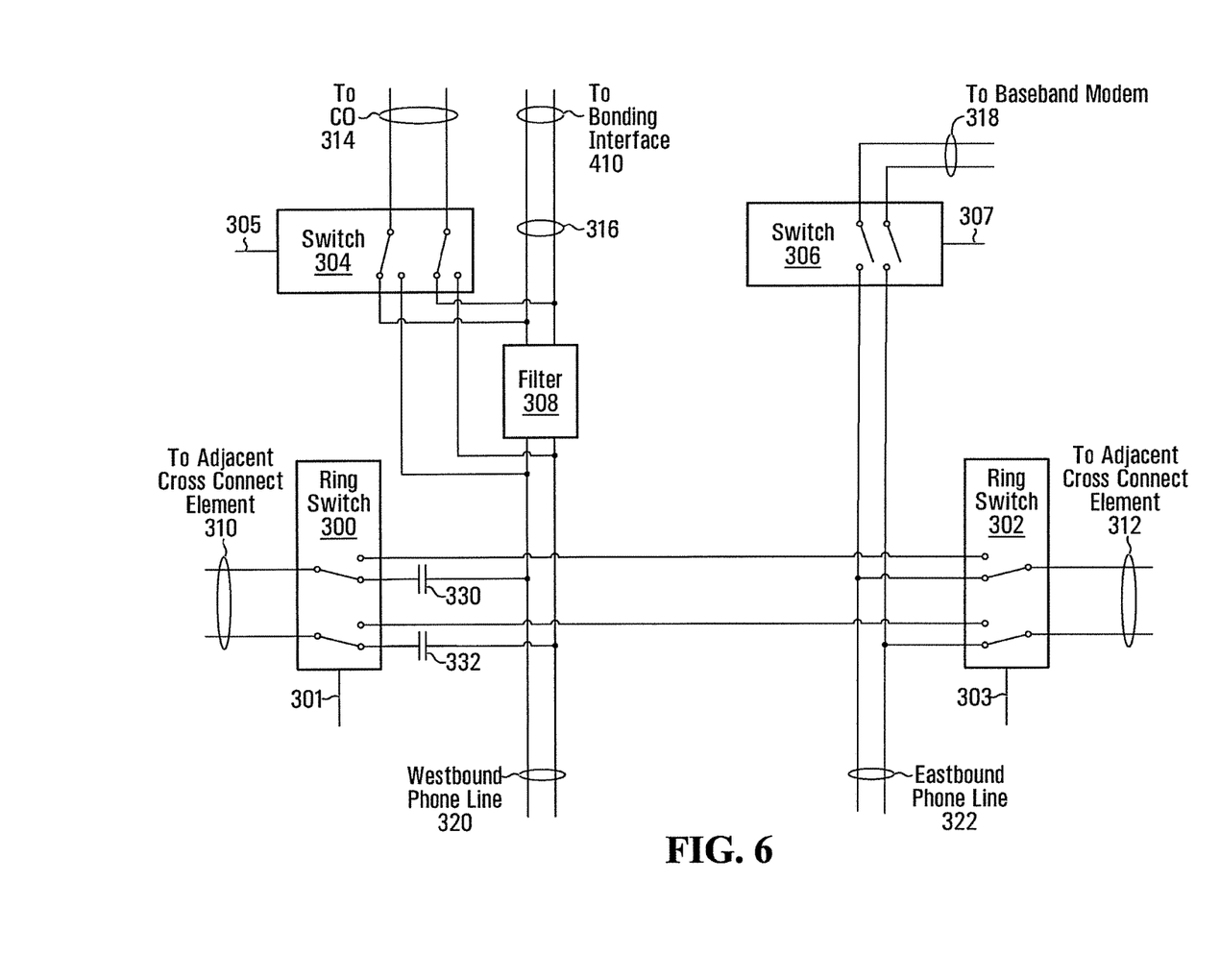

Connection 310 is connected to a first ring switch 300, and connection 312 is connected to a second ring switch 302. When ring switch 300 and ring switch 302 are each in a respective first position (as depicted in FIG. 5), connection 310 is connected directly to connection 312. In this case, the HCC served by the particular cross connect element is not connected to the ring. When ring switch 300 and ring switch 302 are each in a respective second position (as depicted in FIG. 6), the first twisted pair 300 is connected to the westbound phone line 320 through capacitors 330,332 (more generally some form of POTs blocking mechanism), and the second twisted pair is connected to the eastbound phone line 322. The state of switch 300 is controlled by control input 301, and the state of switch 302 is controlled by control input 303. Twisted pair 314 to/from the central office is connected to a switch 304 having a control input 305.

Figure 7:
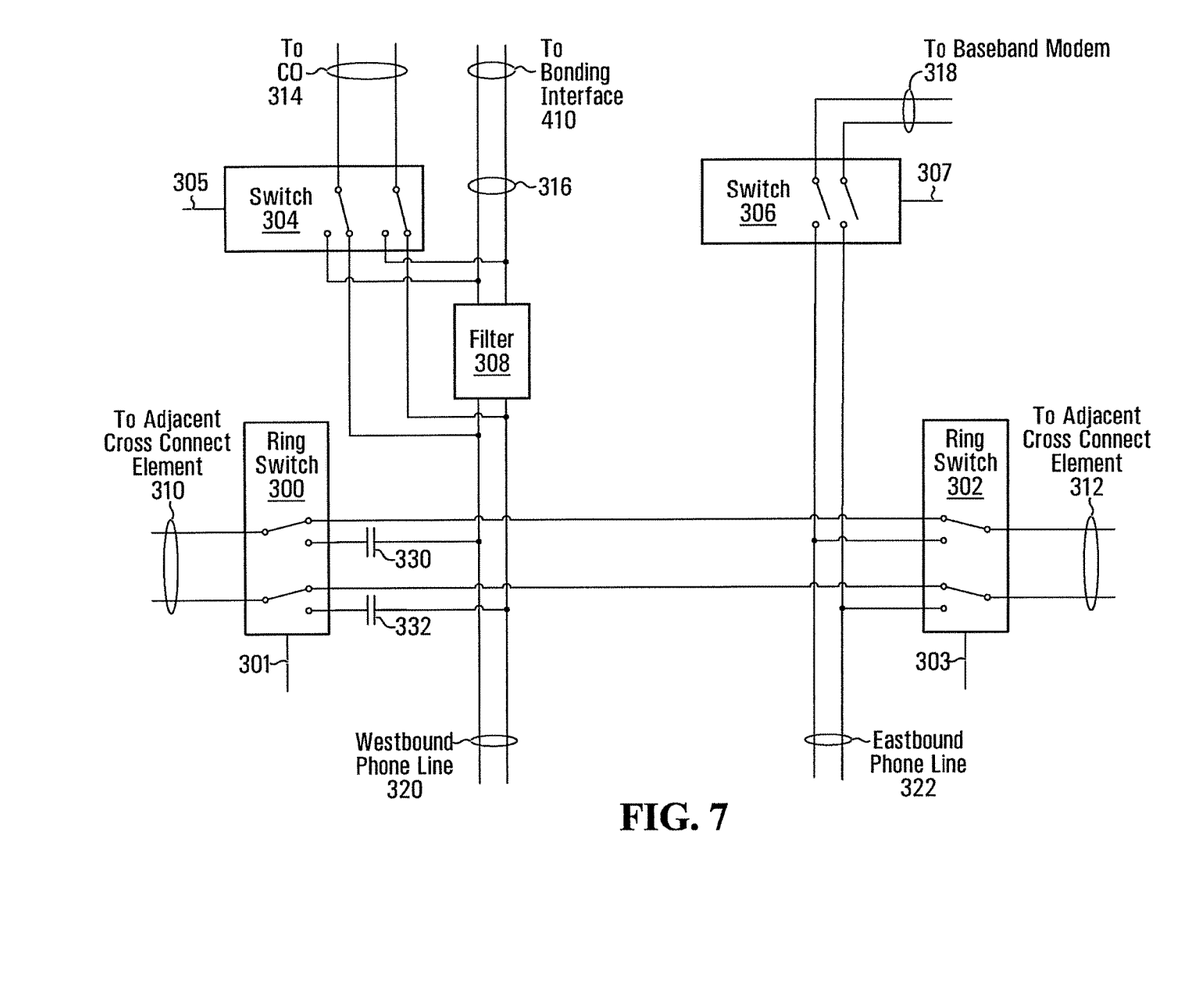

Switch 304 has a first position, as depicted in FIG. 5, in which twisted pair 314 is connected to the west bound phone line 320 through a filter 308 which blocks broadband signal frequencies and passes baseband telephone frequencies. In this state, twisted pair 314 is also directly connected to connection 316 which is connected at broadband frequencies to the bonding interface. Switch 304 has a second position, as depicted in FIG. 7, in which twisted pair 314 is connected directly to the west bound phone line 320, and there is no connection to the bonding interface.

Connection 318 which is connected to the modem, as detailed above, is also connected to a switch 306. Switch 306 may for example be a double pole single throw switch. Mechanical or solid state switches may be employed for switch 396 and the other switches described herein. The other end of the switch 306 is connected to the eastbound phone line 322. Switch 306 has a first position (as depicted in FIG. 5) in which there is a connection between connection 318 from the baseband modem to the eastbound phone line 322. Switch 306 has a second position (as depicted in FIG. 6) in which there is no connection between the modem and the eastbound phone line 322.

Three operational modes will now be described with reference to FIGS. 5, 6 and 7. Note that the cross-connect controller 412 of FIG. 3 controls the operational mode of each CCE through the control connections. Where the CCEs have the structure of FIG. 5, control connection 434 of FIG. 3, for example, represents control connections 301,303,305, 307 collectively of FIG. 5. The cross-connect controller 412 controls which CCE is connected to the baseband modem 414.

In FIG. 5, switches 300 and 302 are in the first position, resulting in the HCC being disconnected from the DSL ring. Note that an HCC that has not subscribed to the broadband service is removed from the ring through appropriate control of the CCEs, and an HCC that has subscribed to the service is removed from the ring if it is powered down. On an ongoing basis, the traffic switch keeps track of the state of connectivity through the ring. When there is a break in the ring, for example because an HCC was powered down, houses on both sides of the break will detect this and can transmit a control packet that indicates the "open ring" state. Then, the cross connect controller 412 uses this information to control the CCEs to bypass that HCC, thereby re-establishing the ring. An HCC that has subscribed to the service, but has been removed from the ring, is an out of service HCC.

In FIG. 5, switch 304 is in the first position meaning that the westbound phone line 320 is connected to the CO through filter 308. In this state, a POTS connection is provided to the HCC from the CO to the westbound phone line 320 via the filter 308. At the same time, the twisted pair 314 is available for use for the bonding interface. Thus, the twisted pair 314 is used both for the POTS signal to the particular HCC, and for the bonding interface. The filter 308 ensures that the DSL component of the signal is blocked from the westbound phone line 320.

Switch 306 is in the first position meaning that the modem is connected to eastbound phone line 322. Since the switch 306 is in the first position, the modem is able to communicate with a corresponding baseband modem in the HCC. This can be used, for example, to detect the state of the HCC, for example powered on or off.

In FIG. 6, switches 300 and 302 are in the second position, resulting in the HCC being connected to the DSL ring. As such, a path for DSL traffic is formed by connection 310 from an adjacent cross connect element, westbound phone line 320, the HCC (not shown), eastbound phone line 322, and connection 312 to an adjacent cross connect element. Capacitors 330,332 ensure that the POTS signal does not go out onto the ring to an adjacent cross connect element Switch 304 is in the first position meaning that the westbound phone line 320 is connected to the CO through filter 308. In this state, a POTS connection is provided to the HCC from the CO to the westbound phone line 320 via the filter 308. At the same time, the twisted pair 314 is available for use for the bonding interface. Thus, the twisted pair 314 is used both for the POTS signal to the particular HCC, and for the bonding interface. The filter 308 ensures that the DSL component of the signal is blocked from westbound phone line 320.

Switch 306 is in the second position meaning that the modem is not connected to eastbound phone line 322. Since the switch 306 is in the second position, the modem is not able to communicate with a corresponding baseband modem in the HCC.

In FIG. 7, switches 300 and 302 are in the first position, resulting in the HCC being disconnected from the DSL ring.

Switch 304 is in the second position meaning that the westbound phone line 320 is connected to twisted pair 314 to the central office directly, without passing through filter 308. In this state, a POTS connection is provided to the HCC from the CO to the westbound phone line 320. In this case, the twisted pair 314 is not available for use for the bonding interface. However, in this circumstance, the bandwidth on twisted pair 314 may be used to provide a service, such as a DSL service, from an alternative provider. The FIG. 7 state is a completely passive state, in the sense that it is like a conventional connection from the central office to the customer premises. Any services available over such a connection can be provided using such a configuration.

Switch 306 is in the second position meaning that the modem is not connected to eastbound phone line 322. Since the switch 306 is in the second position, the modem is not able to communicate with a corresponding analog modem in the HCC.

In operation the modem polls the baseband modems of out of service HCC(s) to see if they respond. When they respond and communicate, that HCC is added back into the ring by appropriate control of the CCEs.

The following is an example process taken to achieve the formation of a ring based on FIG. 3. This example assumes the use of baseband modems to poll the HCCs. More generally any mechanism of ascertaining the status of HCCs may be employed. A similar process can be used to achieve a ring formation with any number of rings. For the purpose of this example, it is assumed that all HCC are powered on and functional. If a given HCC was not powered on, or not present, that HCC would not respond to the poll referred to below and would not be included in the ring.

In some embodiments, when a new node is to be added, a craftsperson puts the new node "in-service" on the gateway node. Once this is done, the polling is initiated as there are more nodes in the ring than in ring tables maintained via the RPR protocol.

Step 1—No HCC in Ring

At start up, the ring only includes the gateway node 115. In other words, the traffic switch 117 is connected to itself, and there is no HCC in the ring. The ring is in a closed state.

Step 2—Add HCC 440 to Ring

The main processor 456 polls for HCC 440 using the modem 414 and receives an acceptable response indicating success. The main processor checks to see if HCC 440 is "Already existing in Ring". Assuming no, the main processor instructs the cross-connect controller 412 to add HCC 440 to the ring by controlling the switches of CCE 400. At this point, there is a closed, 2-node ring with HCC 440 forming part of the ring.

Step 3—Add HCC 442 to Ring

The main processor 456 polls for HCC 442 using the modem 414 and receives an acceptable response indicating success. The main processor checks to see if HCC 442 is "Already existing in Ring". Assuming no, the main processor instructs the cross-connect controller 412 to add HCC 442 to the ring by controlling the switches of CCE 400. At this point, there is a closed 3-node ring with HCCs 440,442 forming part of the ring.

Step 4—Add HCC 444 to Ring

The main processor polls for HCC 444 using the modem 414 and receives an acceptable response indicating success. The main processor checks to see if HCC 444 is "Already existing in Ring". Assuming no, the main processor instructs the cross-connect controller 412 to add HCC 444 to the ring by controlling the switches of CCE 400. At this point, there is a closed 4-node ring with HCCs 440,442,444 forming part of the ring.

Example Method of Taking a Node Out of Ring and Healing the Ring

An example will be described with reference to FIG. 3, where it is assumed the HCC 442 power goes off. When HCC 442's power goes off, the main processor, for example via RPR signalling from HCCs 440,444, detects an interruption in ring traffic:

1. HCCs 440,444 detect an open ring, and inform the main processor 456;
2. main processor 456 asks cross-connect controller to start polling for all HCC using modem 414;
3. main processor 456 polls for HCC 400 using modem 414. This will indicate success. The main processor checks if HCC 400 is "Already existing in Ring". In this case, the answer is yes, so nothing is done and the method continues on with HCC 442.
4. main processor 456 polls for HCC 442 using modem 414. This will indicate failure. The main processor asks the cross connect controller 412 to remove HCC 442 from the ring by controlling the switches of CCE 402 such that HCC 442 is out of the ring. At this point, there is a closed ring with HCC 440 and 444 in and HCC 442 out.
5. When HCCs 440,444 detect a closed ring, main processor 456 is informed. In some embodiments, at this point, polling is stopped and normal state is resumed. In some embodiments, the polling cycle is completed to verify any new HCC added to the ring.
6. If a closed ring is not detected, polling is continued until a closed ring is detected.

Example Method of Adding a Previously Removed Node in to Ring

An example method will be described with reference to FIG. 3 where it is assumed HCC 442 is ready to be added back into the ring.

The example starts when HCC 442 power comes on, such that the HCC comes up and ready for functioning. Baseband modem 73 on HCC 442 is listening for modem 414 which is connected to main processor 456.

After an HCC is removed from the ring due to its being powered down, the main processor 456 executes, for example periodically or continuously, a polling cycle to verify any HCC to join the ring:

1. main processor 456 polls for HCC 400 using modem 414. This will indicate success. The main processor checks if HCC 400 is "Already existing in Ring". In this case, the answer is yes, so nothing is done and the method continues on with HCC 442.
2. main processor 456 polls for HCC 442 using modem 414. This will indicate success. The main processor checks if HCC is "Already existing in Ring". In this case, the answer is no. The main processor 456 adds HCC 442 to the ring by controlling the switches of CCE 402 via the cross-connect controller.

At this point, there is a closed ring that includes HCCs 440, 442, and 444.

Various embodiments of a gateway node capable of connecting a plurality of ADNs in a ring network or linear network have been described. In the described examples, the cross connect elements are part of such a gateway node. More generally, a cross connect node is provided that allows individual ADNs to be bypassed, or not. The described gateway node containing cross connect elements is a specific example of a cross connect node.

More generally, an apparatus for connecting a plurality if ADNs (add drop nodes) in a ring network or linear network is provided, the apparatus having a cross connect node with a plurality of ADN interfaces each for connection to a respective ADN. The cross connect node configured to form the ring network or linear network by selectively including or bypassing each ADN interface. The described gateway nodes are specific examples of a cross connect node. The apparatus may have a traffic switch for adding broadband traffic to the ring or linear network and receiving broadband traffic from the ring or linear network.

The apparatus may also have a status detector that detects whether there is an in-service ADN connected to a bypassed ADN interface. The cross connect node includes a previously bypassed ADN interface in the ring network or linear network as a function of whether the status detector detects that there is an in-service ADN connected to the ADN interface.

In some embodiments, the cross connect node is back-powered from one or more ADN.

The bypass functionality of the cross connect node can be used to bypass connected ADNs that are powered down, or want to not be part of the ring. However, the bypass can also be used to allow formation of a ring where there is no ADN connected to one or more of the CCEs. Not all CCEs need be initially populated. For example, there could be a gateway that accommodates 12 ADNs, but with some smaller number, for example 4, connected with the rest in a bypass state.

Detailed examples of cross connect elements have been described. In some embodiments the cross connect node has a plurality of cross connect elements, each cross connect element for connection to a respective ADN of the plurality of ADNs. Each cross connect element has a first interface and a second interface for use in connecting the cross connect elements in a ring or linear formation. These can be used to connect cross connect elements together, or to connect a cross connect element to a traffic switch, for example. Each cross connect element provides one of the plurality of ADN interfaces, the ADN interface having a third interface connectable to the respective ADN and having a fourth interface connectable to the respective ADN. Each cross connect element having a first state in which the ADN interface is included such that signals are passed between the first interface and the third interface, and signals are passed between the second interface and the fourth interface. Each cross connect element has a second state in which the ADN interface is bypassed such that signals are passed between the first interface and the second interface without being passed to either of the third and fourth interfaces. A cross connect controller controls the state of each of the cross connect elements.

There is a cross connect controller that controls the state of each of the cross connect elements. This is intended to be a very general term—any element or combination of elements that controls the state of the cross connect elements can fulfill the role of the cross connect controller.

In some embodiments there is at least one misconnection detector that detects whether connections from an HCC to the third and fourth interfaces of a CCE have been reversed. A voltage source and detector may be used to achieve this.

In some embodiments, for each of at least one CCE, there is at least one reverse polarity detector that detects whether tip and ring connections from an HCC to the third interface of the CCE have been reversed and detects whether tip and ring connections from an HCC to the third interface of the CCE have been reversed.

In the described embodiments, there is a single baseband modem used to ascertain the status of any connected HCC. In some embodiments, there are multiple baseband modems and a switching network between multiple baseband modems and CCEs. This allows the status of multiple connected HCCs to be ascertained more quickly than if only a single baseband modem is used. Alternatively, there can be a respective baseband modem for each CCE.

The baseband modem(s) can ascertain status of a connected HCC for example by sending a handshake signal. If the appropriate response to the handshake signal is received, then the connected HCC is up and running and can be added to the ring. If no response is received, then the connected HCC is not up and running.

While in the illustrated embodiments, a baseband modem and switching circuitry, in combination with a baseband modem in the HCC are used to ascertain status, more generally, the status of a connected HCC can be ascertained using any appropriate status detector. In a specific example that does not involve the use of modems, the HCC produces a first voltage at the fourth interface when it is ready to be connected to the ring and produces a second voltage (for example zero if it is powered down) when it is not ready to be connected to the ring. For this example, a status detector in the form of a simple voltage detector can be used to ascertain the power status of the connected HCC.

In the illustrated examples, it is assumed that the bonding interface provides a connection to a central office. More generally, this can be used to provide a connection to some upstream network element, for example a central office, an Exchange, a fiber-fed cabinet/SAI/JWI/PCP.

Where in the illustrated examples it is assumed that there is a bonded connection between the gateway and the upstream network element, more generally any suitable shared connection can be used. The connection is shared in the sense that broadband packet traffic for multiple connected HCCs can be carried on the connection. The shared connection can include one or more of bonded copper, optical or wireless to name a few examples.

The illustrated examples also feature a CCE-specific connection to an upstream element for example—see connection 314 of FIG. 5, for example. The CCE-specific connection may be copper or some other technology such as optical or wireless.

In the illustrated example, a bonding interface is used which makes use of N pairs that are dedicated to the bonded connection, and each of the other CCE-specific connections can configurably be included or not in the bonded connection. In some embodiments where a bonded connection is used for the connection to the upstream network element, there are no dedicated pairs for the bonded connection; only CCE-specific connections are included in the bonded connection.

Numerous modifications and variations of the present disclosure are possible in light of the above teachings. It is therefore to be understood that within the scope of the appended claims, the disclosure may be practiced otherwise than as specifically described herein.

We claim:

1. An apparatus for connecting a plurality of add drop nodes (ADNs) in a ring network or linear network, the apparatus comprising:

a cross connect node having a plurality of ADN interfaces each for connection to a respective ADN;

the cross connect node configured to form the ring network or linear network by selectively including or bypassing each ADN interface, wherein the cross connect node comprises:

a plurality of cross connect elements, each cross connect element (CCE) for connection to a respective ADN of said plurality of ADNs, and for each CCE:

i) the CCE having a first interface and a second interface for use in connecting the CCEs in a ring or linear formation via electrically conducting connections;

ii) the CCE providing one of said plurality of ADN interfaces, the ADN interface having a third interface connectable to the respective ADN and having a fourth interface connectable to the respective ADN, the third and fourth interfaces being electrically conducting twisted wire pair interfaces;

iii) the CCE having a first state in which the ADN interface is included such that signals are passed between the first interface and the third interface, and signals are passed between the second interface and the fourth interface, such that the CCE passes traffic to and from a connected ADN in which case the connected ADN is part of the ring network or linear network;

iv) the CCE having a second state in which the ADN interface is bypassed such that signals are passed between the first interface and the second interface without being passed to either of the third and fourth interfaces, such that the CCE does not pass traffic to or from a connected ADN, if present, in which case, a connected ADN, if present, is not part of the ring network or linear network:

a cross connect controller that controls the state of each of the CCEs.

2. The apparatus of claim 1 further comprising:
a traffic switch for adding broadband traffic to the ring or linear network and receiving broadband traffic from the ring or linear network.

3. The apparatus of claim 2 further comprising:
a status detector that detects whether there is an in service ADN connected to a bypassed ADN interface;
wherein the cross connect node includes a previously bypassed ADN interface in the ring network or linear network as a function of whether the status detector detects that there is an in service ADN connected to the ADN interface.

4. The apparatus claim 1 further comprising:
at least one misconnection detector that detects whether connections from an ADN to the third and fourth interfaces of a CCE have been reversed.

5. The apparatus of claim 1 further comprising:
for each of at least one cross connect element, at least one reverse polarity detector that detects whether tip and ring connections from an ADN to the third interface of the CCE have been reversed and detects whether tip and ring connections from an ADN to the fourth interface of the CCE have been reversed.

6. The apparatus of claim 1 further comprising:
at least one baseband modem connectable to ascertain status of an ADN connected to a cross connect element in the second state of said plurality of cross connect elements.

7. The apparatus of claim 1 further comprising:
a status detector for ascertaining status of an ADN connected to a cross connect element in the second state of said plurality of cross connect elements.

8. The apparatus of claim 7 wherein the status detector comprises:
switching circuitry for selecting a cross connect element in the second state of said plurality of cross connect elements to be the ADN for which status is to be ascertained.

9. The apparatus of claim 8 wherein:
the status detector comprises a baseband modem connectable to any ADN of the plurality of ADNs through the switching circuitry;
while in the second state, the fourth interface of each cross connect element is connected to the switching circuitry;
wherein the cross connect controller:
controls the switching circuitry so as to select the fourth interface of which cross connect element is connected to the baseband modem;
attempts to ascertain status of an ADN from the connected fourth interface via the baseband modem; and
controls the state of each of the cross connect elements based on the ascertained status.

10. The apparatus of claim 1 further comprising:
a shared network interface;
each cross connect element has an interface for connection to the shared network interface and a CCE-network interface for connection to an upstream network element, wherein the CCE-network interface for connection to an upstream network element is connected to the third interface.

11. The apparatus of claim 10 wherein in each cross connect element:
the CCE-network interface is selectably connected or disconnected to the shared network interface such that when the CCE-network interface is connected to the shared network interface, the connection to an upstream network element is available for use by the shared network interface, and when the CCE-network interface is disconnected to the shared network interface, the connection to an upstream network element is not available for use by the shared network interface.

12. The apparatus of claim 11 wherein when a given CCE-network interface is disconnected from the shared network interface, and the given CCE is not part of the ring network or linear network, plain old telephone service (POTS) and broadband services can be provided to a connected ADN over the CCE-network interface.

13. The apparatus of claim 11 further comprising:
a filter between the shared network interface and the third interface that blocks broadband frequencies and passes baseband telephony frequencies.

14. The apparatus of claim 13 further comprising in each cross connect element:
a switch having a first state and a second state;
in the first state, the CCE-network interface for connection to an upstream network element being connected to the third interface through the filter;
in the second state, the CCE-network interface for connection to an upstream network element being connected to the third interface without passing through the filter.

15. The apparatus of claim 8 wherein the switching circuitry comprises a respective switch in each cross connect element.

16. The apparatus of claim 10 further comprising:
a traffic switch for adding broadband traffic to the ring or linear network and receiving broadband traffic from the ring or linear network;
wherein the traffic switch and the cross connect elements are interconnected as part of the ring network or linear network;
wherein traffic received at the shared network interface is passed to the traffic switch for transmission on the ring network or linear network.

17. An add drop node (ADN) comprising:
a first broadband modem and a second broadband modem;
a status indicator;
a first telephone line interface;
a second telephone line interface in communication with the status indicator and the second broadband modem;
a plain old telephone service (POTS interface;
a filter to isolate the POTS interface from the first broadband modem;
a switch having a first state and a second state;

the switch while in the first state connects the first telephone line interface to the POTS interface to enable a POTS signal to pass between the first telephone line interface and the POTS interface without passing through the filter;

the switch while in the second state connects the first telephone line interface to the POTS interface through the filter to enable a POTS signal to pass between the first telephone line interface and the POTS interface, and connects the first telephone line interface to the first broadband modem to enable a broadband signal to pass between the first telephone line interface and the first broadband modem;

the status indicator and the second broadband modem connected to the second telephone line interface.

18. The add drop node of claim 17 for connection via the first and second telephone line interfaces to a cross connect element of a plurality of cross connect elements for connecting a plurality of ADNs in a ring network or linear network, wherein:

the add drop node has a first operational state in which the add drop node is unable to participate in the ring network or linear network and having a second operational state in which the add drop node is able to participate in the ring network or linear network by passing traffic between the two broadband modems;

at least while in the second operational state, the add drop node being configured to indicate a status of the add drop node via the second telephone line interface.

19. The add drop node of claim 18 wherein:

the status indicator comprises a baseband modem;

while in the second operational state, the add drop node being configured to indicate a status of the add drop node by responding to a signal received by the baseband modem.

20. The add drop node of claim 18 further comprising:

an add drop multiplexer (ADM) connected to the first broadband modem and the second broadband modem such that while in the second operational state:

as a function of an address of a packet demodulated by the first broadband modem, the ADM drops the packet from the ring network or linear network for further processing by the ADN or passes the packet on to the second broadband modem so as to continue on the ring network or linear network;

as a function of an address of a packet demodulated by the second broadband modem, the ADM drops the packet from the ring network or linear network for further processing by the ADN or passes the packet on to the first broadband modem so as to continue on the ring network or linear network.

21. A method comprising:

providing broadband service to a plurality of endpoints with a ring network;

using a cross connect node to control whether any of the endpoints are bypassed from the ring network, the cross connect node comprising a plurality of cross connect elements, each cross connect element (CCE) connected to a respective endpoint of said plurality of endpoints, each CCE having:

i) first and second connections connecting the CCEs in a ring formation, the first and second connections being electrically conducting connections;

ii) third and fourth connections connected to the respective endpoint, the third and fourth connections being electrically conducting twisted wire pair connections;

iii) a first state in which the respective endpoint is included on the ring network such that signals are passed between the first connection and the third connection, and signals are passed between the second connection and the fourth connection, such that the CCE passes traffic to and from the respective endpoint in which case the respective endpoint is part of the ring network;

iv) a second state in which the respective endpoint is bypassed such that signals are passed between the first connection and the second connection without being passed to either of the third and fourth connections, such that the CCE does not pass traffic to or from the respective endpoint, if present, in which case, the respective endpoint, if present, is not part of the ring network;

wherein using the cross connect node to control whether any of the endpoints are bypassed from the ring network comprises controlling the state of each of the CCEs.

22. The method of claim 21 further comprising:

ascertaining a status of a bypassed endpoint, and as a function of the ascertained status, deciding whether or not to add the bypassed endpoint back into the ring network.

23. The method of claim 22 wherein:

providing broadband service to a plurality of endpoints comprises delivering traffic to each endpoint via the respective third and fourth connections that are connected to the ring network while the corresponding CCE is in the first state, whereby the respective endpoint is not in a bypassed state;

the method further comprising:

connecting plain old telephone service (POTS) to an endpoint via the first third connection whether or not the endpoint is bypassed from the ring network;

selectively bypassing an endpoint from the ring network by switching the state of the corresponding CCE to the second state, thereby disconnecting the third and fourth connections from the ring network;

while an endpoint is bypassed from the ring network, using the fourth connection to ascertain status of the endpoint.

24. The method of claim 22 further comprising:

for a given endpoint, using a twisted pair to provide plain old telephone service (POTS) connectivity;

selectively using the twisted pair as part of a broadband backhaul connection.

25. The apparatus of claim 1, wherein the electrically conducting connections connecting the CCEs in a ring or linear formation are electrically conducting tracks on a circuit board.

* * * * *